Feb. 9, 1937. R. D. CARLETON ET AL 2,069,996
RELEASABLE TANK AND BOMB RACK
Filed Feb. 21, 1935 4 Sheets-Sheet 1

INVENTORS
RALPH D. CARLETON and
CLEM G. TRIMBACH
BY
ATTORNEY

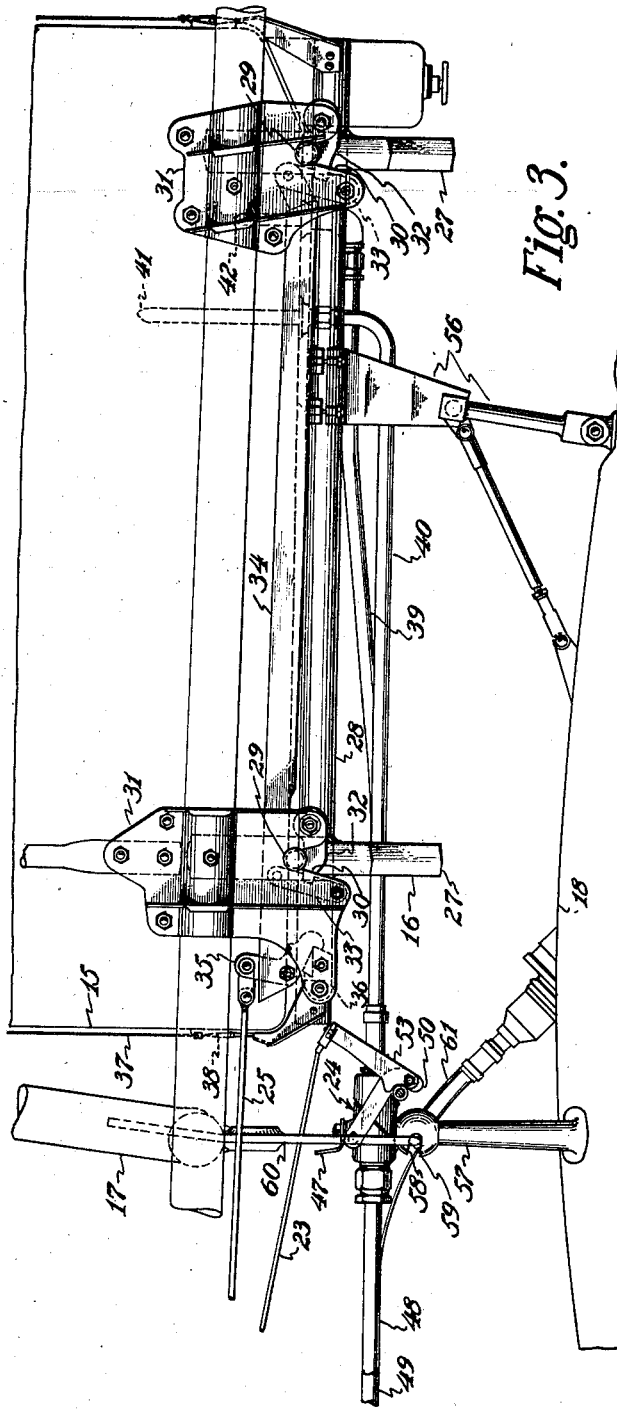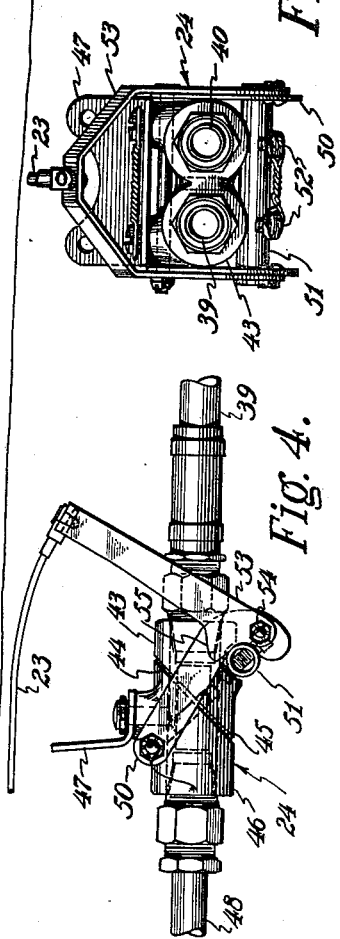

Feb. 9, 1937. R. D. CARLETON ET AL 2,069,996
RELEASABLE TANK AND BOMB RACK
Filed Feb. 21, 1935 4 Sheets-Sheet 3

INVENTORS
RALPH D. CARLETON and
CLEM G. TRIMBACH
BY
ATTORNEY

Feb. 9, 1937.  R. D. CARLETON ET AL  2,069,996
RELEASABLE TANK AND BOMB RACK
Filed Feb. 21, 1935  4 Sheets-Sheet 4

INVENTORS
RALPH D. CARLETON and
CLEM G. TRIMBACH
BY
ATTORNEY

Patented Feb. 9, 1937

2,069,996

UNITED STATES PATENT OFFICE 2,069,996

RELEASABLE TANK AND BOMB RACK

Ralph D. Carleton, Snyder, and Clem G. Trimbach, Eggertsville, N. Y., assignors to Curtiss-Wright Corporation, a corporation of New York Application February 21, 1935, Serial No. 7,476

5 Claims. (Cl. 244—135)

This invention relates to aircraft, and is particularly concerned with mounting arrangements for fuel tanks and armament, such as bombs.

Although the invention may be used in any type of aircraft, it is particularly adapted for military craft of the ground attack type, which are usually of two-place capacity and in which it is necessary for the pilot to be placed as far forward as possible in order that he may have maximum visibility, and in order that he may be able to look directly down over the side of the fuselage without interference from the leading edge of the wing. This type of aircraft also carries a gunner occupying a rearward cockpit. In the conventional type of craft it has been customary to place the fuel tanks forward of the pilot and directly behind the engine, but this location interferes with forward placement of the gunner and also, since it is necessary, in case of forced landing, to rid the ship of hazardous equipment such as bombs, fuel tanks and the like. If the tanks were located forwardly of the center of gravity, the balance of the aircraft would be seriously upset should they be released when nearly full. Thus, it is contemplated in this invention, to locate the main fuel tank substantially coincidental with the center of gravity of the airplane with part of the crew ahead thereof, and to provide means by which the fuel tank may be dropped clear of the ship in case of emergency. Since craft of this type are adapted to carry additional equipment in the form of bombs, or extra fuel supply, or smoke-producing equipment, we find it convenient to suspend this alternative auxiliary equipment below the main fuel tank and to the same part of the structure which holds the main fuel tank. Thus, in an emergency, dropping of the main fuel tank simultaneously drops the auxiliary equipment which is bound to be hazardous in case of forced landing, and also, the extra equipment, which varies in weight for different forms thereof, is located directly below the center of gravity.

A primary object of this invention is to provide means for supporting the main fuel tank and an auxiliary fuel tank, or bombs, or smoke tanks, in such a manner that they may be released.

Another object is to provide means for breaking all connections between the tanks and auxiliary equipment so that the parts such as fuel lines, bomb controls and the like may not be severed or turn asunder under the influence of dropping of the equipment.

Another object is to provide a tank and auxiliary equipment support which may be completely assembled to the main tank, after which the whole unit may be installed in the aircraft.

A further object is to provide a standard form of tank cradle which may be attached to the aircraft fuselage, which cradle may be made up on the ground, alternatively, with bomb equipment, extra tank equipment, or smoke apparatus.

Further objects will become apparent in reading the subjoined specification and claims, and from an examination of the drawings, in which similar numbers indicate similar parts, and in which:

Fig. 3 is an enlarged side elevation in detail, showing the tank supporting mechanism, an auxiliary belly tank attached thereto, and the breakable fuel connections associated with said tanks;

Fig. 4 is an enlarged side elevation of the breakable fuel connection;

Fig. 5 is an end elevation of the breakable fuel connection;

Figure 1:
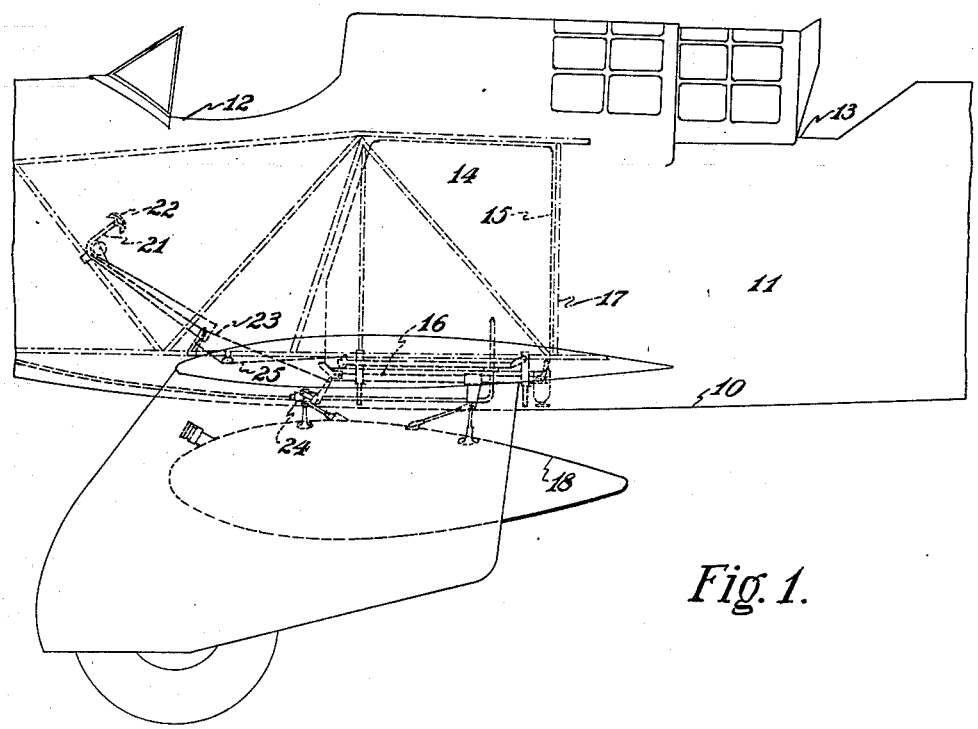
Fig. 1 is a side elevation of part of an aircraft fuselage, showing principally in dotted lines, the releasable main fuel tank inside the fuselage, and showing an auxiliary streamlined belly tank carried by the main tank supporting mechanism.
Figure 2:
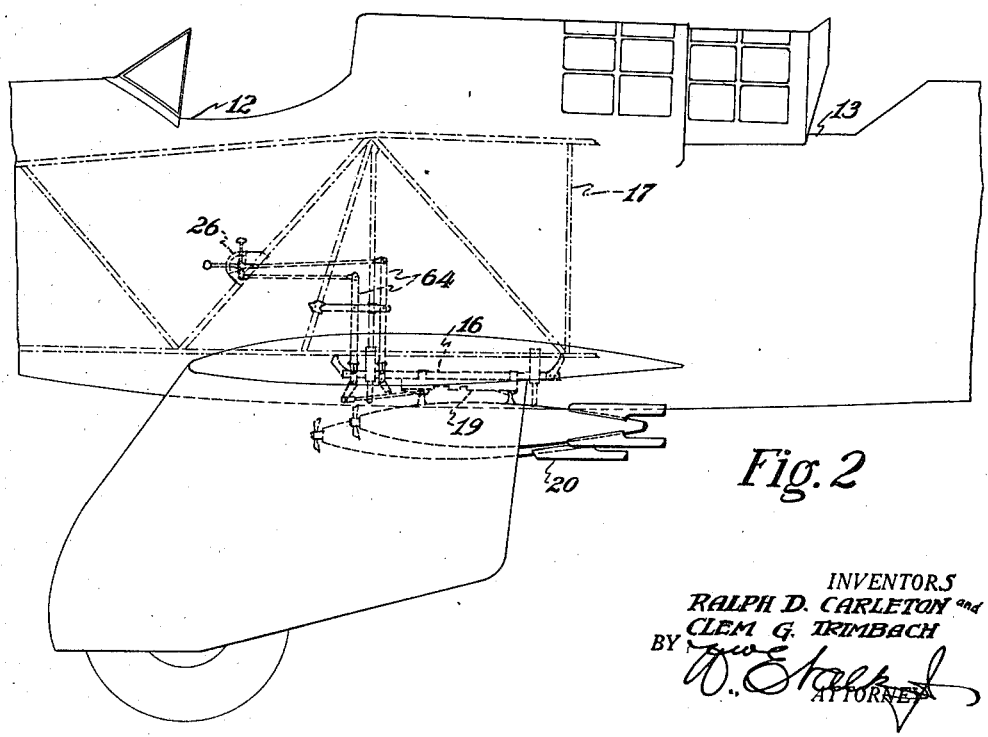
Fig. 2 is a side elevation, generally similar to Fig. 1, but indicating the attachment of a plurality of bombs in place of the streamlined belly tank.

The aircraft 10 includes a fuselage 11 having a forward cockpit 12 and a rearward cockpit 13 with a space 14 provided between the cockpits for the accommodation of a main fuel tank 15. Said tank is strapped to a cradle 16, which is releasably mounted in the fuselage structure 17, the cradle being provided with mechanism therebelow for the support of an auxiliary streamlined fuel tank 18 which lies below the fuselage and in the airstream. The cradle 16 is also arranged so that the fuel tank 18 may be removed therefrom and conventional bomb racks 19 may be attached thereto for the support of bombs 20. Although not shown, any other form of auxiliary equipment may be attached below the cradle 16, such as smoke-producing tanks or the like. In Fig. 1, the operating means for releasing the cradle 16, with the tank 15 and suspended auxiliary equipment, is shown at 21, this means including a pull handle 22 to which a cable 23 is attached for the breaking of the fuel connection 24, and to which a cable 25 is attached for releasing the cradle 16 with its attached equipment. The same form of releasing means 21 is included when bombs are carried, as in Fig. 2, but when bombs are carried, separate bomb releasing means 26 are installed so that any one of the bombs 20 may be released at will from the cradle 16, without dropping the cradle.

Figure 6:
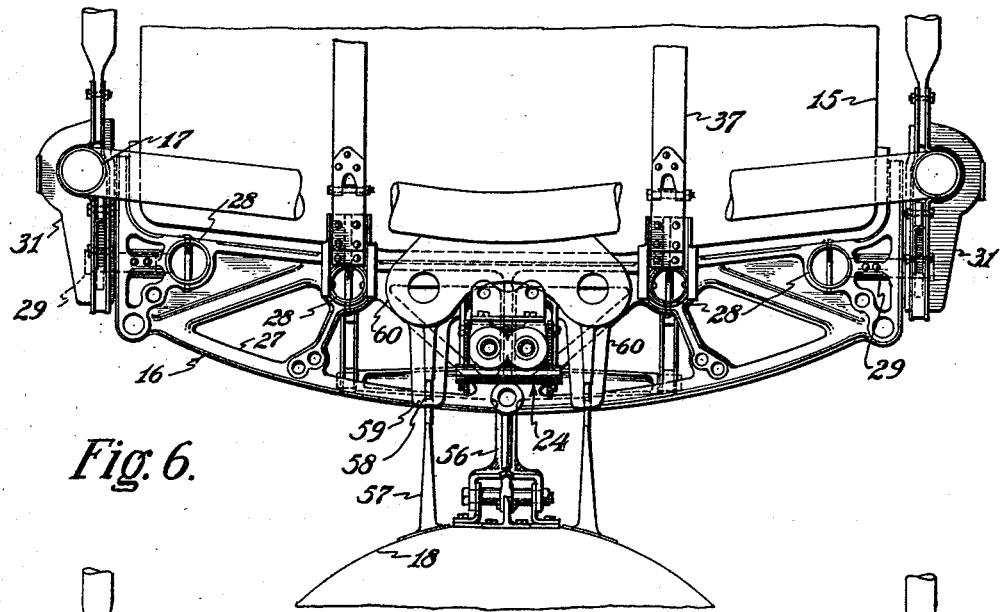
Fig. 6 is a front elevation of the releasable main tank supporting cradle having an auxiliary belly tank associated therewith.

Now referring to Figs. 3 and 6, the cradle 16 comprises transverse trusses 27 joined by longitudinals 28, each truss 27 having laterally extending studs 29 for engagement within slots 30 formed in fittings 31 carried by the longerons of the fuselage structure 17. To each fitting 31 a dog 32 is pivoted, which dog may swing upwardly to hold the stud 29 within its slot 30. A sear 33 is also pivoted to the fitting, said sear having a notch within which the free end of each dog 32 may engage, upon which engagement the cradle 16 is firmly but releasably held to the fuselage. The several sears 33 are joined by longitudinal trigger bars 34 at the forward ends of which are pivoted bell cranks 35, one end of each of which is notched to engage a catch 36 fixed to the forward fitting 31. The cradle releasing cable 25 is shackled to the opposite end of the bell crank 35. By a sharp pull on the cable 25, the bell crank is released from the catch 36, and further pulling of the cable 25 pulls the trigger bar 34 forwardly, carrying with it the sears 33 and disengaging said sears from the dogs 32 to permit release of the cradle 16.

It will be noted that the main fuel tank 15 rests upon the cradle 16, and is fixedly clamped thereto by straps 37 terminating in fittings 38 fixed to end portions of the cradle.

Figs. 3, 4, 5, and 6 show the fuel conduits from the gas tank 15 extending forwardly through the breakable connection 24 to an engine (not shown) to be supplied with fuel. As shown, two conduits 39 and 40 extend to the main fuel tank, the conduit 40 extending well up into the tank as at 41 to provide a normal service fuel capacity, while the conduit 39 extends only a short distance within the tank, as at 42, to provide a reserve supply. Suitable valve switching means, well known in the art, are provided by which the pilot may switch from service supply to reserve supply should he run short of fuel.

Both of the conduits 39 and 40 extend to a fitting 43, of the breakable connection 24, having a biased forward face 44 engageable with a similarly biased face 45 of a fitting 46, said fitting being fixedly attached to the aircraft as by a bracket 47. From the fitting 46, fixed fuel conduits 48 and 49 extend forwardly to the engine. The biased faces 44 and 45 of the fittings 43 and 46 are held in engagement with one another by means of hooks 50 pivoted to the fitting 46 and extending downwardly and rearwardly to hook around a transverse tube 51 adjustably attached to the fitting 43 by means of screws 52. On assembly of the separable fuel connection, the screws 51 are loosened and the faces 43 and 45 placed in engagement. Thereupon, the hooks 50 are engaged around the tube 51 and the screws 52 are tightened to effect a leaf-proof joint in the assembly. Release levers 53 are pivoted at 54 toward the ends of the hooks 50, said release levers having cam portions 55 resting against the ends of the tube 51. The levers 53 are joined to the fuel valve release cable 23. Upon pulling said cable 23, the levers 53 are rocked on their pivots, the cams 55 engaging against the tube 51, and forcing the hooks 50 from their engagement with said tube. Thereupon, the fitting 43 is free to drop clear from the fitting 46. As previously mentioned, the cables 23 for the fuel connection 24, and the cable 25 for the tank cradle, are simultaneously operated so that the cradle assembly may drop clear of the aircraft without destroying the fixed portions of the fuel conduit system.

The belly tank 18, shown in Figs. 3 and 6, may be semi-permanently attached at its rearward end to the cradle 16 by means of fittings and struts generally designated as 56. The forward end of the tank 18 carries struts 57 having forwardly opening slots 58 within which an eye 59 of a bracket 60 engages, said bracket being fixed to the aircraft. When the cradle 16 is released, the rearward end of the tank 18 moves therewith, whereupon the strut 57 disengages the bracket 60 and the tank 18 may drop clear with the cradle and main fuel tank 15. As shown, a fuel conduit 61 from the auxiliary tank 18, extends upwardly and forwardly to the main fuel control valve (not shown) and this conduit 61 may obviously be provided with a separable fuel connection such as 24, or with some equivalent device.

Smoke tanks, when used, may be attached to the cradle 16 and to the fuselage in substantially the same manner as provided for the auxiliary fuel tank 18.

Figure 7:
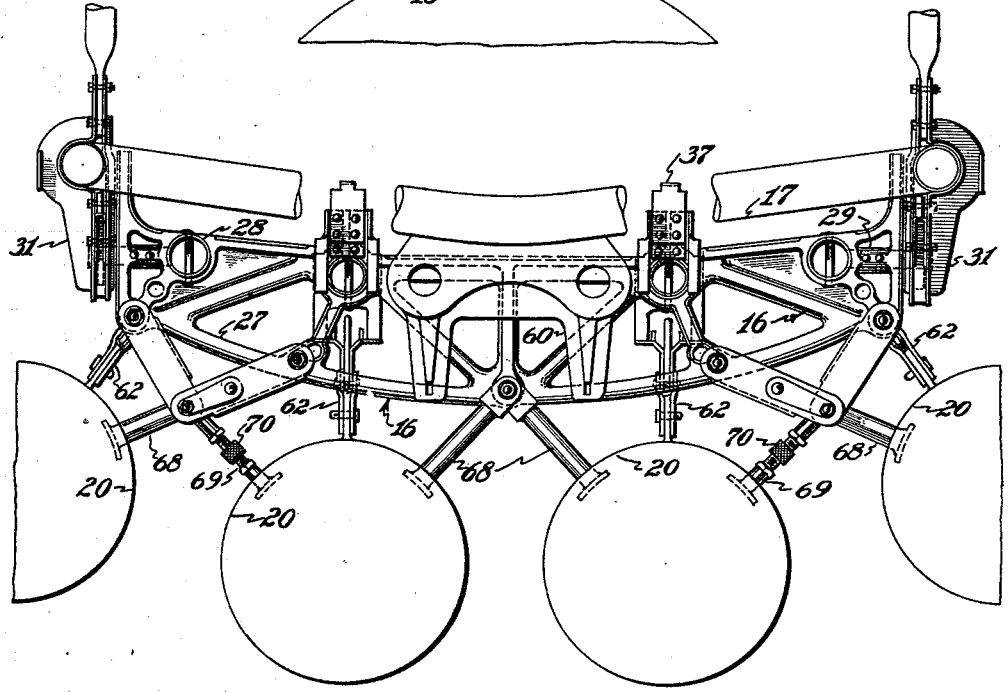
Fig. 7 is an end elevation similar to Fig. 7, showing the alternative attachment of bombs to the main tank cradle.
Figure 8:
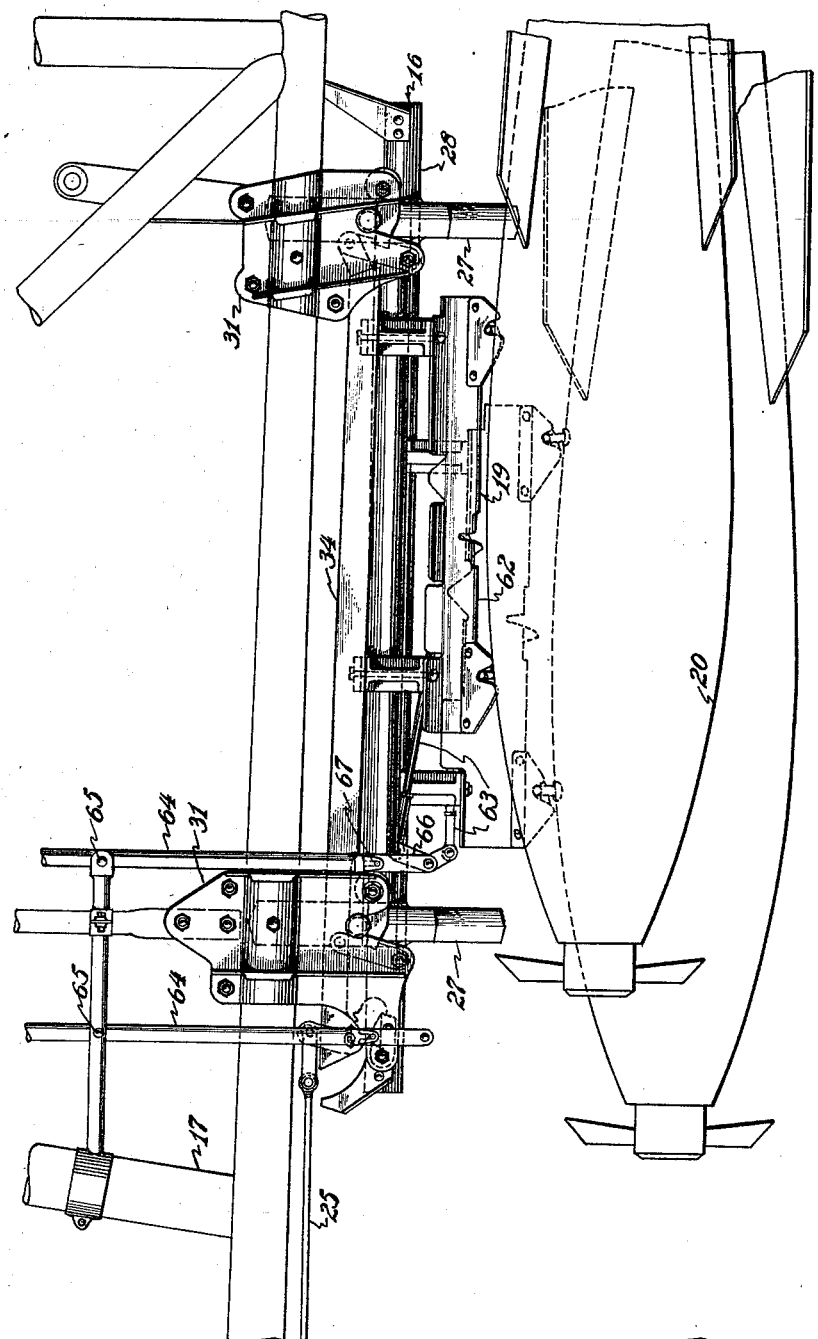
Fig. 8 is a side elevation, generally similar to Fig. 3, showing the attachment of bombs in place of the auxiliary belly fuel tank.

Referring now to Figs. 7 and 8, we show the alternative installation of a plurality of bombs on the cradle 16. Here, the elements 56 are removed, and in place thereof, several bomb racks 62 are attached directly to the longitudinal tubes 28 of the cradle 16. These bomb racks in themselves form no part of the invention, and are of a character well known in the art. Push-pull tubes 63 extend forwardly from each bomb rack to levers 64 pivoted at 65 to the aircraft structure. The joints between the levers 64 and the tubes 63 are such that, when the cradle 16 is released from the aircraft, the bombs, bomb rack 62 and cradle 16 all drop free, while the levers 64 remain intact with the aircraft. Such joints, indicated at 66, comprise a vertically slippable connection by which fore and aft movement of the levers 64 operates the push-pull tubes 63, but when the cradle 16 with its equipment falls clear, a light shear pin 67 breaks to allow free separation between the elements of the joint.

In Fig. 7 is shown the bomb suspension apparatus, and struts 68 are fitted to the cradle truss to steady the bombs from lateral oscillation while the craft is in flight. Certain of these struts, such as 69, are adjustable by a nut 70, to permit of facile mounting of the bombs. When mounting the bombs, the struts 69 are shortened and the bombs suspended from their respective racks 62. Thereupon, the struts 68 are put in place, the struts 69 are put in place, and the latter struts are then lengthened to firmly hold the bombs in position. Releasing of any one of the bomb racks 62 permits its respective bomb to drop clear without interference and without likelihood of interference with any other part of the aircraft.

The bomb release levers 64 are suitably connected to the bomb release handle organization 26 in the pilot's cockpit.

Generally summarizing the mechanism as a whole, it will be seen that the cradle 16 is releasably held at its four corners to the fuselage of the aircraft. The main fuel tank, mounted on the cradle, and any auxiliary apparatus carried below the cradle, are simultaneously releasable by operating the handle 22, this maneuver generally being accomplished in case of the necessity for a forced landing when it is desired to rid the craft of hazardous components thereof. In normal military operation, one phase involves bombing missions and the mechanism heretofore described, permits of the normal dropping of bombs individually. In other types of missions, as for long distance observation or ground strafing or the like, when a greater supply of fuel is carried, or when it is desired to produce a smoke screen, the bombs 20 are replaced by fuel tanks or smoke tanks which are relatively non-expendible and which would only be dropped, along with the cradle 16 and the main fuel tank, in case of emergency.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. In aircraft having a fuselage, a cradle releasably attached across the lower side thereof, a main fuel tank mounted on said cradle and arranged normally to lie within said fuselage, and independently releasable auxiliary apparatus carried by and below said cradle, a single means for simultaneously releasing said cradle, tank and apparatus from said aircraft, and separate means for selectively releasing said apparatus only from said cradle.

2. A demountable assembly for an aircraft fuselage comprising a cradle, a fuel tank mounted on and above said cradle for normally occupying a portion of said fuselage, auxiliary apparatus suspended below and releasably attached to said cradle, means for selectively releasing said apparatus from said cradle, and means selectively operable to release said cradle, with said tank and apparatus, from said fuselage.

3. In aircraft, in combination, a bomb rack for a plurality of bombs, means for selectively releasing individual racked bombs, means for selectively releasing the rack and bombs as a unit, and a tank carried by and above said rack and releasable therewith.

4. In aircraft having a releasable fuel tank, a cradle by which said tank is carried and having lugs extending therefrom, fittings on said aircraft having downwardly opening slots within one of which each said lug is engageable, a dog pivoted to said fitting for holding said lug within said slot, a sear engageable with said dog for holding the latter in lug-retaining position, and a trigger bar connected to a plurality of said sears for simultaneously releasing all lugs from their respective fittings.

5. In an aircraft fuselage, a fuel tank normally lying therewithin, a cradle on which said tank is mounted, means for releasably attaching said cradle, at a plurality of points, to said fuselage, a belly tank secured at one end to said cradle and a slip joint connecting the other end of said belly tank to said fuselage, said slip joint being releasable upon dropping away of said cradle and main tank from said fuselage.

RALPH D. CARLETON.
CLEM G. TRIMBACH.